(12) United States Patent
Wishman et al.

(10) Patent No.: US 8,522,322 B2
(45) Date of Patent: Aug. 27, 2013

(54) PLATFORM FIRMWARE ARMORING TECHNOLOGY

(75) Inventors: Allen R. Wishman, Cornelius, OR (US);
Sergiu D. Ghetie, Hillsboro, OR (US);
Michael Neve De Mevergnies,
Beaverton, OR (US); Ulhas S. Warrier,
Beaverton, OR (US); Adil Karrar, San
Francisco, CA (US); Douglas R. Moran,
Folsom, CA (US); Kirk Brannock,
Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 300 days.

(21) Appl. No.: 12/887,866

(22) Filed: Sep. 22, 2010

(65) Prior Publication Data
US 2012/0072734 A1 Mar. 22, 2012

(51) Int. Cl.
*G06F 21/00* (2006.01)
(52) U.S. Cl.
USPC ............................................................ 726/5
(58) Field of Classification Search
USPC ........................................................ 713/189
See application file for complete search history.

(56) References Cited

U.S. PATENT DOCUMENTS

| | | | |
|---|---|---|---|
| 2005/0216904 A1* | 9/2005 | Needham | 717/168 |
| 2006/0059300 A1 | 3/2006 | Hsu et al. | |
| 2006/0140399 A1* | 6/2006 | Young | 380/30 |
| 2006/0174240 A1 | 8/2006 | Flynn | |
| 2007/0192611 A1* | 8/2007 | Datta et al. | 713/176 |
| 2009/0094414 A1 | 4/2009 | Hsu et al. | |
| 2009/0327684 A1* | 12/2009 | Zimmer et al. | 713/2 |

OTHER PUBLICATIONS

International Search Report and Written Opinion received for PCT Patent Application No. PCT/US2011/051160, mailed on Apr. 10, 2012, 9 Pages.

* cited by examiner

*Primary Examiner* — Michael S McNally
(74) *Attorney, Agent, or Firm* — Blakely, Sokoloff, Taylor & Zafman LLP (57) ABSTRACT

A method, apparatus, method, machine-readable medium, and system are disclosed. In one embodiment the method includes is a processor. The processor includes switching a platform firmware update mechanism located in a computer platform to a platform firmware armoring technology (PFAT) mode on a boot of the computer platform. The computer platform includes a platform firmware storage location that stores a platform firmware. The method then persistently locks the platform firmware storage location in response to the platform firmware update mechanism switching to the PFAT mode. When persistently locked, writes are only allowed to the platform firmware storage location by an Authenticated Code Module in the running platform and only after a platform firmware update mechanism unlocking procedure.

25 Claims, 4 Drawing Sheets

PLATFORM FIRMWARE ARMORING TECHNOLOGY

FIELD OF THE INVENTION

The invention relates to securely updating computer platform firmware.

BACKGROUND OF THE INVENTION

The first set of instructions that are operational on a computer system originate from the platform firmware. Platform firmware may include firmware associated with a basic input/output system, extendible firmware, embedded controller and microcontroller firmware, and any other such firmware residing at storage locations within the computer platform. Platform firmware is not generally static throughout the lifetime of a computer system. There are updates to platform firmware just as there are updates to operating systems and software applications. Because firmware instructions are so crucial to the successful operation of many computer systems, it is imperative that when firmware is updated, the update occurs in a secure manner.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of an apparatus, system, method, and computer-readable medium capable of securely updating platform firmware are disclosed.

Firmware in a computer system may provide many types of initialization, management, and operational instructions for one or more devices in a computer system. The updating of firmware generally is fraught with security holes. If a malicious entity is able to provide a compromised piece of firmware to a computer system, the breach can be severe because firmware is generally below the level of standard virus-level protection during operation of the computer system. Thus, security during the updating of platform firmware is vitally important.

In many embodiments, a platform firmware armoring technology (PFAT) mode is enabled in a computer system. The PFAT mode restricts the ability of most entities from updating platform firmware. Specifically, the PFAT mode can require system management firmware updates to be performed by an authenticated code module (ACM) in a secure authenticated code (AC) mode. In standard operation mode, a platform component hub (PCH) may stop any writes from reaching the storage. To allow a firmware update, logic may invoke the ACM, and the ACM may then unlock the firmware storage for writes by performing a special write cycle to a CPU register. In many embodiments, the ACM is the only entity that may perform the special write cycle and then once the firmware storage is unlocked, the ACM is the only entity that may perform the actual firmware update. Additionally, the ACM may measure the updated firmware image to verify its authenticity using a public key provisioned to the CPU.

Figure 1:
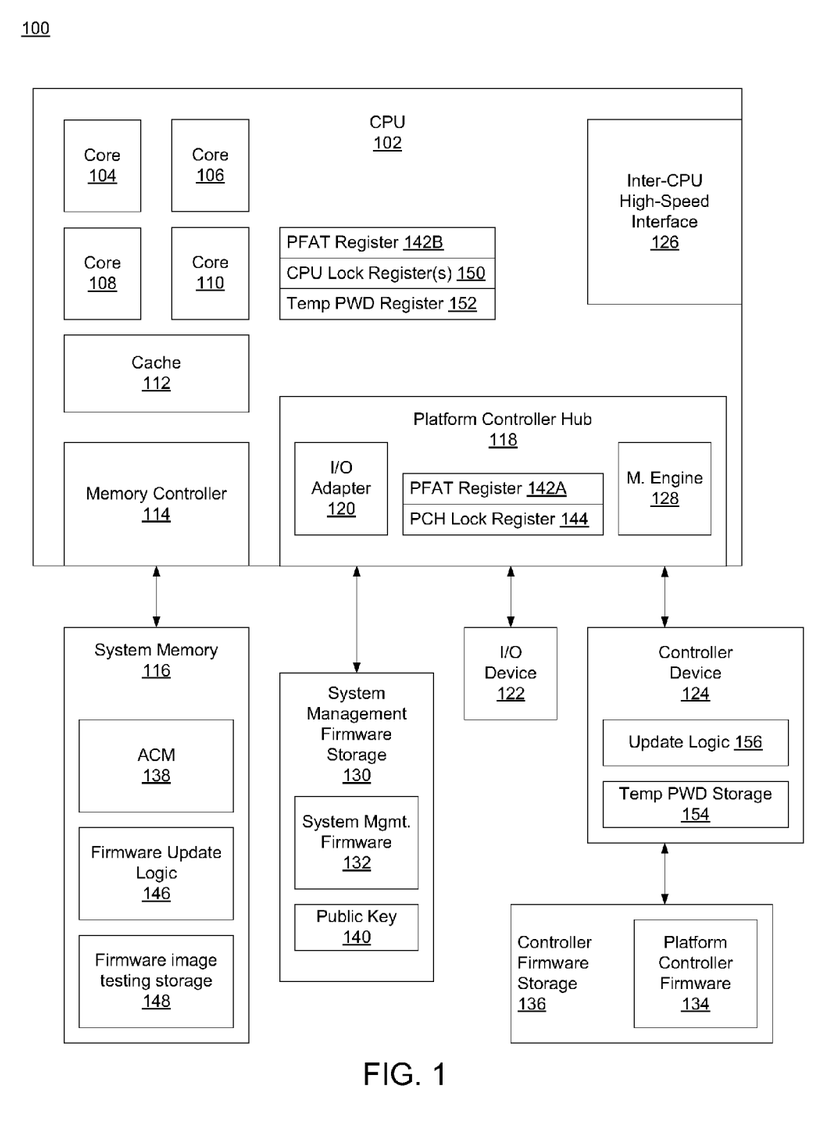
FIG. 1 illustrates an embodiment of a computer system capable of securely updating a platform firmware.

FIG. 1 illustrates an embodiment of a computer system capable of securely updating a platform firmware.

Computer system 100 is shown. The computer system may be a desktop, server, workstation, laptop, handheld, television set-top, media center, game console, integrated system (such as in a car), or other type of computer system. In several embodiments the computer system 100 includes one or more central processing units (CPUs), also referred to as "processors." Although in many embodiments there are potentially many CPUs, in the embodiment shown in FIG. 1 only CPU 102 is shown for clarity. CPU 102 may be an Intel® Corporation CPU or a CPU of another brand. CPU 102 includes one or more cores in different embodiments. CPU 102 is shown including four cores (Cores 104, 106, 108, and 110).

In many embodiments, each core includes internal functional blocks such as one or more execution units, retirement units, a set of general purpose and specific registers, etc. In a single-threaded core, each core may be referred to as a hardware thread. When a core is multi-threaded or hyper-threaded, then each thread operating within each core may also be referred to as a hardware thread. Thus, any single thread of execution running in the computer system 100 may be referred to as a hardware thread. For example, in FIG. 1, if each core is single-threaded, then there are four hardware threads present in the system (four cores). On the other hand, if each core is multi-threaded and has the capability of maintaining the states of two threads simultaneously, then there are eight hardware threads present in the system (four cores with two threads per core).

CPU 102 may also include one or more caches, such as cache 112. In many embodiments that are not shown, additional caches other than cache 112 are implemented so that multiple levels of cache exist between the execution units in each core and memory. In different embodiments cache 112 may be apportioned in different ways. Additionally, cache 112 may be one of many different sizes in different embodiments. For example, cache 112 may be an 8 megabyte (MB) cache, a 16 MB cache, etc. Additionally, in different embodiments the cache may be a direct mapped cache, a fully associative cache, a multi-way set-associative cache, or a cache with another type of mapping. In many embodiments, cache 112 may include one large portion shared among all cores or may be divided into several separately functional slices (e.g., one slice for each core). Cache 112 may also include one portion shared among all cores and several other portions that are separate functional slices per core.

In many embodiments, CPU 102 includes an integrated system memory controller 114 to provide an interface to communicate with system memory 116. In other embodiments that are not shown, memory controller 114 may be located in a discrete elsewhere in computer system 100.

System memory 116 may comprise dynamic random access memory (DRAM), such as a type of double data rate (DDR) DRAM, non-volatile memory such as flash memory, phase change memory (PCM), or another type of memory technology. System memory 116 may be a general purpose memory to store data and instructions to be operated upon by CPU 102. Additionally, there may be other potential devices within computer system 100 that have the capability to read and write to the system memories, such as a direct memory access (DMA)-capable I/O (input/output) device.

The link (i.e., bus, interconnect, etc.) that couples CPU 102 with system memory 116 may include one or more optical, metal, or other wires (i.e. lines) that are capable of transporting data, address, control, and clock information.

Platform controller hub 118 (e.g., an I/O controller hub) includes an I/O interface that enables communication between the CPU 102 and external I/O devices. The hub may include one or more I/O adapters, such as I/O adapter 120. I/O adapters translate a host communication protocol utilized within the CPU 102 to a protocol compatible with a particular I/O device, such as I/O device 122. Some of the protocols that a given I/O adapter may translate include a Peripheral Component Interconnect (PCI), Universal Serial Bus (USB), IDE, SCSI, and 1394 "Firewire," among others. Additionally, there may be one or more wireless protocol I/O adapters. Examples of wireless protocols are Bluetooth, IEEE 802.11-based wireless protocols, and cellular protocols, among others.

Controller device 124 resides in the computer system 100 in many embodiments. The controller device 124 may incorporate a number of functions. For example, a RAID storage controller device may be present within computer system 100. The RAID controller may manage an array of hard disk drives or solid state disks (SSDs). Other examples of the controller device may be a discrete out-of-band manageability engine, an embedded microcontroller, or another type of controller.

Inter-CPU high-speed interface 126 may provide an interface to a link coupled to one or more additional CPUs and allow inter-CPU communications to take place. E.g., Inter-CPU high-speed interface may be a quick path interconnect (QPI) or other similar interface.

Although not shown, in many embodiments, computer system 100 includes hardware and software logic capable of providing a virtualized environment with one or more guest operating systems (OSs) running in virtual machine (VM) environments. A virtual machine monitor (VMM) or hypervisor may be implemented in logic within the system to isolate each VM's operating environment (i.e. so each VM and the OS and applications running within it is isolated from and unaware of other VMs present in the system.

A manageability engine 128 is present in the system 100 in many embodiments. The manageability engine may include a number of features including management logic related to remote management, security management, and power management. In many embodiments, the manageability engine 128 utilizes an out-of-band (OOB) communication channel that operates below the level of an operating system (OS) running on the computer system 100. The OOB channel generally will be capable of maintaining communication with a remote system regardless of the state of the OS. In many embodiments, the OOB channel also is capable of continuing communication while the computer system 100 is in a low power state or completely shut down. In some embodiments, the manageability engine 128 comprises Intel® Active Management Technology hardware logic. In other embodiments, another form of hardware logic is utilized.

Firmware is stored in the computer system 100 in many embodiments. Firmware stored anywhere within computer system 100 may be referred to as "platform firmware." More specifically, there are many types of firmware that may be present. For example, a system management firmware storage location 130 may store system management firmware 132. The system management firmware 130 may comprise extendible firmware, a basic input/output system (BIOS), and/or other types of firmware that may be utilized to provide key instructions for the computer system 100, such as during a boot process. Another firmware in the computer system may include platform controller firmware 134 for the controller device 124. This firmware may be stored in platform controller firmware storage 136, which is coupled to the controller device 124. The platform controller firmware 132 may provide instructions regarding management of the features of the controller device 124.

In many different embodiments, each firmware storage location in the system (e.g., the system management firmware storage location 130, the platform controller firmware storage location 136, etc.) comprises a type of non-volatile memory such as NAND flash, NOR flash, phase change memory, or another form of non-volatile memory.

Although not shown for sake of clarity, the CPU may have additional interfaces, such as high speed I/O interfaces to handle graphics and network traffic. In many embodiments, these high speed I/O interfaces may include one or more PCI-Express interfaces.

The computer system 100 stores code to securely launch an authenticated code module (ACM) 138, which is a software module that is invoked and signed (i.e., a secure measurement of the module) by the CPU 102. The ACM 138 may be signed using asymmetric cryptography using a private key that is managed by the manufacturer of the CPU 102. When the CPU 102 invokes the ACM 138, it is first authenticated using a hash of a provided public key that is stored in the CPU 102, chipset-related circuitry such as a discrete PCH, or other hardware in the computer system. The public key is utilized to decrypt information encrypted by the internal private key. In general, the public key will be immutable. By measuring the ACM 138 using these well known security procedures, the module can be verified as a trusted execution environment. The ACM may run within an authenticated code (AC) mode for security purposes. While in AC mode, the ACM is uninterruptable by all system interrupts and events and is protected from other system and DMA agents. When running in AC mode, only one hardware thread is active, thus all other hardware threads are rendezvoused and brought into a quiescent/sleep state.

A firmware update public key 140 may be provided and stored in the system management firmware storage 130 during or prior to the first boot of the computer system 100. The firmware update public key 140 may be utilized to authenticate firmware image information. In some embodiments, the public key 140 is utilized exclusively for authentication of firmware images. Although the term "public key" is utilized and some embodiments store an actual alphanumeric, unencrypted key, in other embodiments, the "public key" may refer to a hash of the public key. The public key may be stored in read-only memory (ROM) in the processor or elsewhere. A hash may be stored instead of the full public key potentially to save storage space. A firmware image to be written into the computer system may include the public key. The public key in the image may then be hashed and compared to the hash of the public key already stored in system ROM. In certain embodiments, the hash may be encrypted for additional security purposes.

In many embodiments, the computer system 100 is capable of entering a platform firmware armoring technology (PFAT) mode. The PFAT mode causes a lockdown of the platform firmware(s). While in PFAT mode, only the ACM running in AC mode is allowed to perform updates (i.e., write) to the firmware storage locations in the computer system 100. And even the ACM is required to perform special process to allow writes to platform firmware storage. Once in PFAT mode, the computer system is not capable of exiting the mode. In many embodiments, PFAT mode is entered upon each boot of the computer system causing a lockdown of the memory address space where any firmware is located. For example, since the system management firmware storage 130 is coupled to the CPU 102 through the platform controller hub 118, any writes targeting the system management firmware storage 130 are routed through the platform controller hub 118. When the system is in PFAT mode, any attempted write (without first utilizing a secure ACM-based unlock procedure) to a memory location reserved for system management firmware storage 130 will be rejected by the platform controller hub 118. The secure ACM-based unlock procedure will be discussed below.

In many embodiments, code executed within firmware during the boot process will set a write-once register that enables PFAT mode. For example, a PFAT management register located in the platform may have a PFAT enable bit to enable PFAT mode. In some embodiments, the PFAT management register is located in the platform controller hub 118 (PFAT register 142A). In other embodiments, the PFAT management register is located elsewhere in the CPU uncore (PFAT register 142B). This register may have several bits associated with managing PFAT mode. For example, the PFAT register may include a PFAT mode enable bit, which, when set, enables PFAT mode. Also, the PFAT register may also include a PFAT mode lockdown bit, which, when set, does not allow further updates to the PFAT mode enable bit (at least until a full reset of the platform). The lockdown bit eliminates the ability of a malicious entity disabling PFAT mode during normal operation of the computer system 100.

As discussed, once in PFAT mode, regular writes to memory address space representing the system management firmware storage 130 are not allowed. In many embodiments, when the computer system 100 enters PFAT mode, the platform controller hub 118 sets an internal PCH lock register 144, which indicates that writes to system management firmware storage 130 are not allowed. Any transactions attempting a write to the firmware storage 130 will be discarded by the platform controller hub 118 when the PCH lock register 144 is set.

Additionally, firmware update logic 146 running on top of an OS is present in system memory 116 in many embodiments. Firmware update logic 146 may receive a request to update a particular firmware present in the computer system 100. This update request may come from a system administrator over a network, it may come from internally within the system (e.g., a modification from a remediation OS), or elsewhere. In many embodiments, the request to update the firmware comes with an image of the actual update. The firmware image either might come directly with the request or later once the request is received and accepted. The firmware image might be a complete rewrite of the firmware (e.g., a new version) or possibly a smaller update (e.g., a rewrite of a small portion of the overall firmware. At some point in time, the firmware update logic 146 receives the actual image of the update. The firmware update image is stored within firmware image testing storage 148 in system memory 116. Once the firmware update logic 146 has stored the entire image into the testing storage, the ACM 138 is invoked and the system enters AC mode. During the transition from standard mode running the firmware update logic 146 to the ACM 138 running in AC mode, the firmware update logic 146 hands the ACM 138 a pointer to the firmware image testing storage 148 location in system memory 116. This handoff may utilize a register in the CPU 102 to store the pointer or the pointer may be stored in a known handoff location in system memory 116.

Once in AC mode and with the location of the stored firmware image in hand, the ACM 138 initiates an authentication procedure of the firmware image utilizing the public key 140. The authentication procedure utilizes asymmetric encryption to decrypt and measure the received firmware image. In many embodiments, the immutable public key stored in the computer system may be utilized to verify that a firmware image received from a vendor is authentic. In many embodiments, the public key is accessible to any entity, in other embodiments, a limited set of entities have the access privileges to read the storage location that stores the public key. For example, in some embodiments, the ACM 138 in AC mode is the only entity capable of accessing the public key 140 stored in the CPU 102.

The ACM 138 performs a public key measurement to authenticate the firmware image stored in firmware image testing storage 148. If the firmware image can be successfully authenticated (i.e., the image's security has not been compromised), then the ACM 138 performs a special write cycle to a lock register 150 in the CPU 102. In many embodiments, the lock register 150 in the CPU 102 is a special MSR (model-specific register) that can only be written to by an ACM in AC mode. Thus, this register is off-limits to a standard-mode OS or another similar entity. This special write cycle to the lock register 150 causes the CPU 102 to generate a secure ACM-based unlock command sent to the platform controller hub 118. When this secure unlock command arrives, logic within the platform controller hub 118 will clear the PCH lock register 144. When the PCH lock register 144 is cleared, the platform controller hub 118 will allow writes to the system management firmware storage 130 address space.

Once writes are allowed to the firmware storage, the ACM 138 then copies the authenticated firmware image from the firmware image testing storage 148 location to the system management firmware storage 130. Once the copy is complete, the ACM 138 may issue a subsequent lock command by issuing another special write cycle to the CPU lock register 150, which in turn causes the generation of a secure ACM-based lock command sent to the platform controller hub 118. When the platform component hub 118 receives the lock command, logic within the hub sets the PCH lock register 144 and the system management firmware storage 130 is once again blocked from receiving any writes.

The preceding example in FIG. 1 dealt with an update to the system management firmware 132. In another example, the update may be related to the platform controller firmware 134.

During each boot of the computer system 100, an ephemeral (i.e., temporary) password may be generated. The logic to generate this ephemeral password may be in the CPU 102, in the system management firmware 132 or elsewhere in the computer system 100. The ephemeral password is normally generated in an early boot sequence prior to normal operation of the computer system by an operating system. The generated ephemeral password is stored internally in a temporary password register 152 in the CPU 102. This same password is also distributed to any controller or other device in the computer system that requires a secure handshake with the CPU during normal operation. A controller, such as controller device 124, may have an internal temporary password storage location 154 to store the password received during the boot-time password distribution. This ephemeral password is generally created, distributed, and stored during a secure boot process to allow for higher security. The secure boot process is less likely to be compromised than during normal operation, thus the distribution of the ephemeral password during this time makes it less likely the password will be stolen.

Subsequently, after the computer system 100 is fully operational (e.g., running an OS), a request to update platform controller firmware 134 may be received by the firmware update logic 146. When this request is received, the same process takes place regarding copying the update image to the firmware image testing storage location 148. The firmware update logic 146 invokes the ACM 138 and passes control of the system to the ACM 138. The ACM 138, in turn, authenticates the image, and, if the image is successfully authenticated, attempts to perform the firmware update. Though, unlike with the system management firmware 132, the ACM 138 does not have complete control over the platform controller firmware 134.

The controller device 124 may have its own security procedures and separate operational requirements than the CPU 102. Essentially, the controller device 124 desires to know for certain that write requests to the controller firmware storage 136 space are actually originating from the ACM 138. To create a more secure verification process, the ACM 138 may send a request to the controller device 124 perform a firmware update to address space in the controller firmware storage 136. This ACM-based request may arrive with the ephemeral password.

To verify the authenticity of the received ACM 138 request, the controller device 124 may compare the received ephemeral password in the request with the stored ephemeral password that originally arrived during the current boot of the computer system 100. In many embodiments, update logic 156 within the controller device 124 performs this comparison. If the two passwords are equal, the controller device 124 may open up the controller firmware storage 136 address space to writes originating from the ACM 138. Otherwise the controller firmware storage 136 remains locked and the controller device 124 may generate an error message of some kind indicating the security issue. In many embodiments, to keep the ephemeral password safe in the temporary password register 152 in the CPU 102, the register is accessible only by the ACM 138 in AC mode. Also, in many embodiments, once the ACM 138 has finished writing the authenticated firmware image to the controller firmware storage 136, the ACM 138 may then send a subsequent communication to the controller device 124 stating the update has completed, so the controller device 124 knows to disallow further writes to the controller firmware storage space 136.

In many embodiments, the ACM may implement rollback protection for firmware updates. Rollback protection restricts the update of the platform firmware to only newer version of the firmware update image. In some embodiments, the firmware image may have a header that includes the firmware version and the currently resident firmware has a similar header. The ACM may read both headers and only allow the new firmware image to be written to the firmware storage location if the new firmware image is a more recent version of the firmware than the currently residing firmware in the platform.

Figure 2:
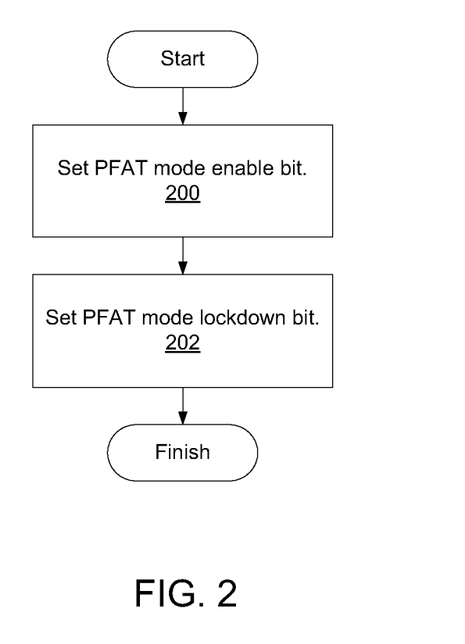
FIG. 2 is a flow diagram of an embodiment of a process to lock down a platform component hub from allowing writes to a system management firmware storage space.

FIG. 2 is a flow diagram of an embodiment of a process to lock down a platform component hub from allowing writes to a system management firmware storage space. The process may be performed by processing logic that may comprise hardware circuitry, software code, firmware code, or a combination of any of the those three types of processing logic. Anything using the term processing logic throughout this entire document may effectively be implemented in any combination of the logics described above as well as even other forms of logic.

The process begins by processing logic during a boot of a processor setting a PFAT mode enable bit (processing block 200) to activate a firmware update protection mechanism in the computer system. The PFAT mode enable bit may be located in a firmware management register in a PCH device in the computer system. Once the PFAT mode enable bit is set to enable PFAT, processing logic then sets a PFAT mode enable lockdown bit (processing block 202). The PFAT mode enable lockdown bit does not allow further modification of the PFAT mode enable bit. In many embodiments, the PFAT mode enable lockdown bit is a write-once bit per boot of the computer system. In these embodiments, during a full reset of the computer system, the PFAT mode lockdown bit may again be modifiable. Thus, the process to enable PFAT mode and then lockdown PFAT mode would occur during each boot.

Although in other embodiments not shown in FIG. 2, the PFAT mode enable bit is a write-once register that cannot be modified after written to for the entire remaining life of the computer system. In these embodiments, the PFAT mode enable bit will be written to once during each boot of the computer system and will thereafter (until the computer system is rebooted) indicate whether the computer system has PFAT mode enabled. This processing block is shown as block 200. Also, in these embodiments, the PFAT mode enable lockdown bit is not necessary as the PFAT mode enable bit will never be writeable again after the first write during the boot process. Thus, processing block 202 is not necessary in these alternative embodiments.

Once this process is finished, the computer platform continues its boot procedures.

Figure 3A:
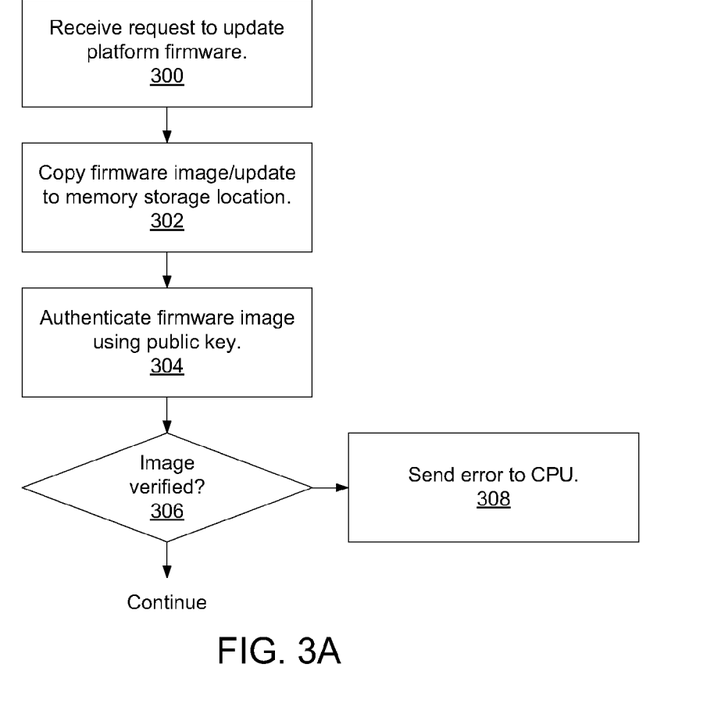
FIG. 3A illustrates a flow diagram of an embodiment of a process to begin a secure platform firmware update procedure.

FIG. 3A illustrates a flow diagram of an embodiment of a process to begin a secure platform firmware update procedure.

Processing logic begins by receiving a request to update platform firmware (processing block 300). This request may relate to any type of updatable firmware in the entire computer system. Thus, in some embodiments this may refer to system management firmware, in other embodiments, this may refer to platform controller firmware, and yet in other embodiments there are even other types and locations of firmware stored in the computer system/platform.

The process continues by processing logic copying a firmware image associated with the request to a location in system memory (processing block 302). The image may be of the complete firmware or of just a portion depending on the type of update. In many embodiments, the image is encrypted. The encrypted image may have been encrypted using an asymmetrical encryption algorithm that takes advantage of a public key. The public key may be provisioned to the computer system when the system is being built or at a later time. The public key may be stored securely in a non-writeable memory location, such as in a secure portion of the system management firmware storage. Returning to FIG. 3A, once the firmware image has been copied to system memory, processing logic authenticates the image using the available public key stored in a secure location in the computer system (processing block 304).

Block 304 and on in FIG. 3A may be processed by logic in an ACM invoked in the system and running in AC mode. Invoking the ACM is discussed above in regard to FIG. 1. In many embodiments, the authentication process includes verifying the immutable public key stored in the system matches the public key included with the image. The image may be measured using a security process in the computer system. The process to determine the authenticity of the image may take several forms, but the desired result is to confirm that the image has not been compromised. Processing logic checks to see if the image has been verified as authentic (processing block 306). Separately, although not shown, the firmware image potentially is sent in an encrypted form, which would require an extra decryption key accessible by the ACM to allow for decryption of the image prior to authentication.

If the authentication of the image fails, processing logic sends an error message to the CPU (processing block 308). For example, processing logic may initiate an interrupt that communicates the failure/problem with the authentication of the image. On the other hand, if the authentication of the image succeeds (i.e., the image is verified as authentic), then processing logic may proceed to the process illustrated in FIG. 3B.

Figure 3B:
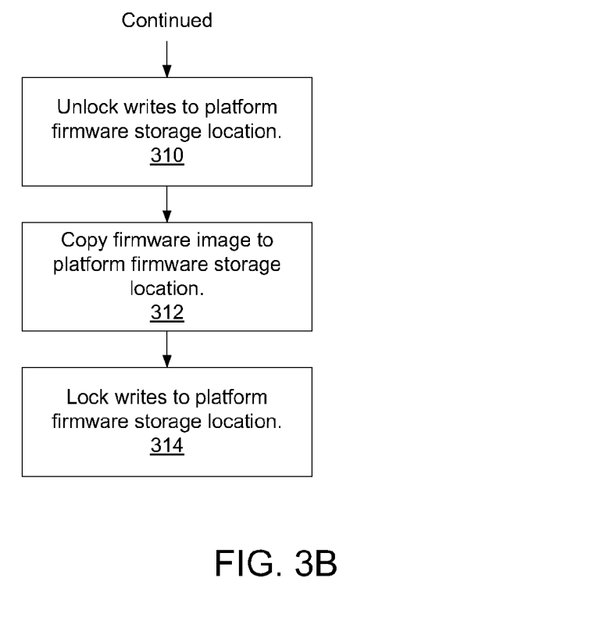
FIG. 3B illustrates a flow diagram of an embodiment of a process to continue a secure platform firmware update procedure.

FIG. 3B illustrates a flow diagram of an embodiment of a process to continue a secure platform firmware update procedure.

At this point in the process flow, processing logic (e.g., logic in the ACM) unlocks the platform firmware storage location to allow writes to take place (processing block 310). In embodiments where the platform firmware storage location is a system management firmware storage location (as described above in regard to FIG. 1), logic within the ACM, upon verifying the authenticity of the image (in block 306 in FIG. 3A), proceeds with unlocking the PCH to allow writes to the system management firmware storage location. In other embodiments where the platform firmware resides in controller storage, another process is required to continue with writes to the firmware storage (the controller firmware-based process is described in FIG. 4).

Returning to FIG. 3B, once the platform firmware storage location is unlocked, processing logic copies the firmware image to the platform firmware storage location (processing block 312). Finally, after the authenticated image is copied to the platform firmware storage location, processing logic then locks the firmware storage location so no more writes are allowed (processing block 314) and the process is finished.

As discussed further above, the platform firmware storage unlocking process depends on where the firmware storage is located. In the case where the platform firmware storage is the system management firmware storage location, the unlocking process may require an ACM (138 in FIG. 1) running in AC mode to write to a CPU lock register (150 in FIG. 1). In many embodiments, the CPU lock register is an MSR in the CPU (102 in FIG. 1) uncore. A special write MSR (WRMSR) command that may be initiated only by the ACM in AC mode writes to the CPU lock register. This process then generates a special write that targets the PCH lock register (144 in FIG. 1) residing in the PCH (118 in FIG. 1). The write command targeting the PCH lock register may cause the PCH to open up a write ability to the system management firmware storage (130 in FIG. 1), which would allow the ACM to write the new system management firmware image to the correct storage location. A similar WRMSR command can then be initiated to the same CPU lock register upon completion of writing the image to relock the system management firmware storage.

Figure 4:
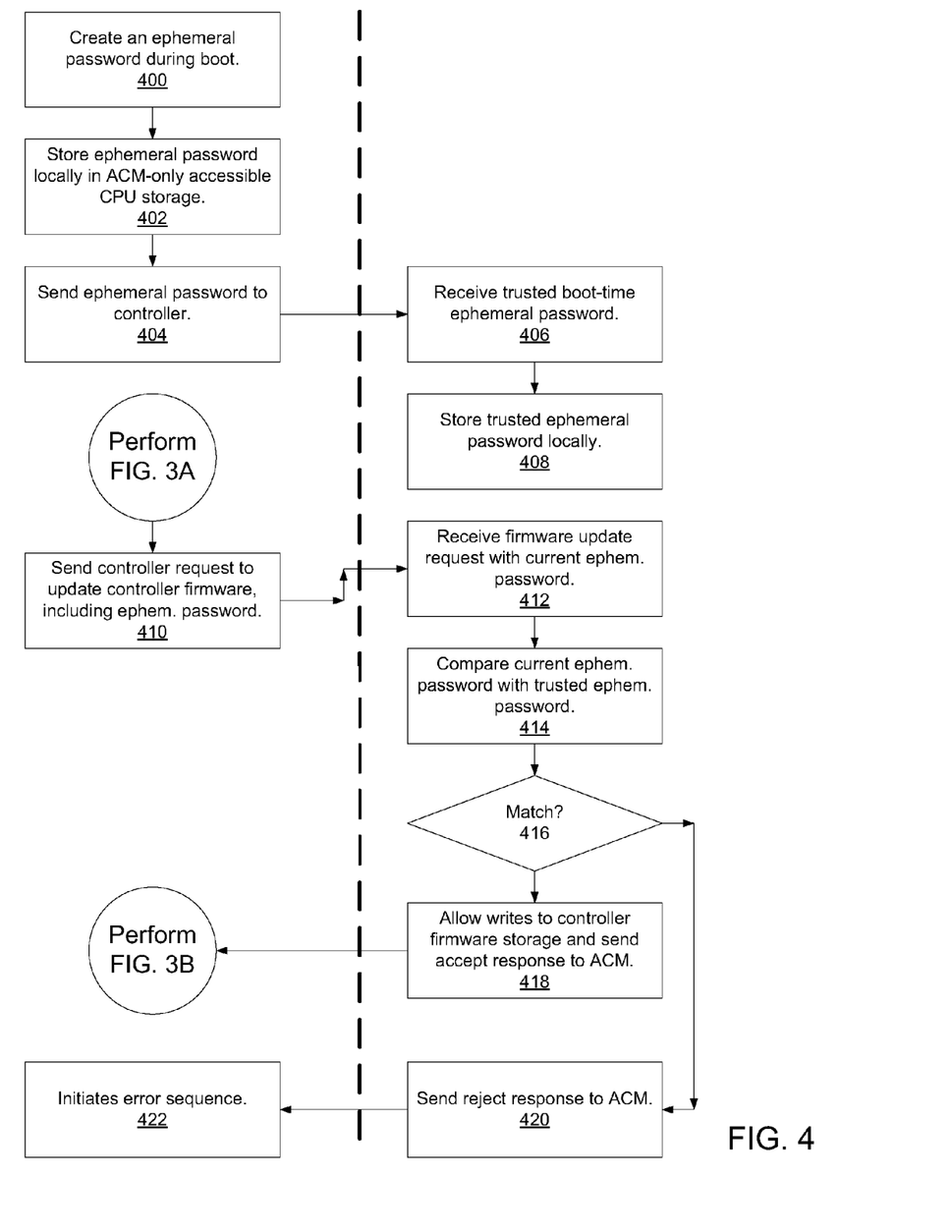
FIG. 4 is a flow diagram of an embodiment of a process to securely update a controller firmware in a computer system.

FIG. 4 is a flow diagram of an embodiment of a process to securely update a controller firmware in a computer system. In many embodiments, the process flow illustrated in FIG. 4 includes processing logic for the ACM/CPU as well as processing logic for the controller in question. Thus, to make the process clear as to where the logic processing each block, the left side of FIG. 4 (to the left of the thick dashed line) may represent logic related to the CPU/ACM and the right side of FIG. 4 (to the right of the thick dashed line) may represent logic related to the controller.

CPU-based processing logic begins during a boot sequence of the computer platform by creating an ephemeral password (processing block 400). The ephemeral password may be randomly generated by the current system management firmware or by other logic within the computer system. This random password will then be stored by processing logic locally in an ACM-only accessible storage location in the CPU or in another secure storage location accessible by the CPU (processing block 402). For example, temporary password register (152 in FIG. 1) in the CPU may store this generated ephemeral password and this register may be accessible only by the ACM in AC mode.

CPU-based processing logic then sends the ephemeral password to the controller (processing block 404). Controller processing logic, still during the system boot sequence, receives the ephemeral password (processing block 406). At this point of time, the controller processing logic assumes the ephemeral password is valid because the system has yet to enter into normal operation and should not yet have a chance to have been compromised. The processing logic then stores the received ephemeral password locally (processing block 408) (e.g., it may be stored in temporary password storage 154 in FIG. 1). At this point processing logic in the controller waits until a firmware update request is received.

In the meantime, returning to FIG. 3A, an entity may request to update platform firmware (300 in FIG. 3A) and CPU/ACM-based processing logic will go through the blocks associated with FIG. 3A to authenticate the new controller-specific platform firmware image. Once the image has been authenticated, ACM processing logic processes the next block in FIG. 4A and sends the controller a request to update the controller firmware, which includes the ephemeral password in the request (processing block 410). The controller logic receives the firmware update request with the current ephemeral password that was stored by the CPU (processing block 412). Next, controller processing logic compares the current ephemeral password just received with the request with the trusted ephemeral password that was received during the boot process (processing block 414).

If there is a match (processing block 416), then controller processing logic then allows writes from the ACM to the controller's firmware storage and sends an acceptance of the update response to the ACM (processing block 418). The ACM-based processing logic can then continue its update processing by continuing with the controller update in the processing blocks of FIG. 3B. Otherwise, if there is not a match, then controller processing logic sends a reject response to the ACM (while continuing to not allow writes to the controller's firmware storage. The ACM-based logic receives the reject response and initiates an error sequence (processing block 422). The error sequence might be as varied as generating an interrupt, setting an error flag, causing a shutdown of the system, or sending out-of-band information related to the error through a management engine (128 in FIG. 1) to an information technology administrator, among other responses.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A method, comprising:
switching a platform firmware update mechanism located in a computer platform to a platform firmware armoring technology (PFAT) mode on a boot of the computer platform, wherein the computer platform includes a platform firmware storage location storing a first platform firmware;
in response to the platform firmware update mechanism switching to the PFAT mode, persistently locking the platform firmware storage location, wherein, when persistently locked, writes are not allowed to the platform firmware storage location by any entity other than an Authenticated Code Module (ACM) after a platform firmware update mechanism unlocking procedure.

2. The method of claim 1, wherein the unlocking procedure further comprises:
the platform firmware update mechanism initiating a special memory write cycle to a PFAT protection control register, wherein the special memory write cycle to the PFAT protection control register causes a controller coupled to the platform firmware storage location to accept write commands from the platform firmware update mechanism to an address space of the platform firmware storage location.

3. The method of claim 2, further comprising:
providing a public encryption key to the platform firmware storage location;
receiving an unsecure request to update the first platform firmware with an updated firmware image;
loading the updated firmware image into a system memory in the computer platform in response to the unsecure request;
invoking the ACM once the firmware image has completely loaded into system memory;
performing an authentication of the updated firmware image using the public encryption key;
executing the unlocking procedure for the platform firmware storage location in response to the updated firmware image being successfully authenticated; and
copying the authenticated firmware image from the system memory to the platform firmware storage location.

4. The method of claim 3, further comprising:
issuing an error when the authentication of the firmware image fails.

5. The method of claim 3, wherein the first platform firmware comprises a system management firmware and wherein the controller comprises a platform component hub.

6. The method of claim 3, wherein the first platform firmware comprises a controller management firmware and wherein the controller comprises an controller located in the computer platform.

7. The method of claim 6, further comprising:
at each boot of the computer platform,
generating an ephemeral password;
storing the ephemeral password in a secure location accessible only by the ACM; and
distributing the ephemeral password to at least the controller coupled to the platform firmware storage location.

8. The method of claim 7, further comprising:
in response to the successful authentication of the updated firmware image using the public encryption key, the ACM sending a secure request to the controller requesting permission to update the controller management firmware, wherein the secure request includes the ephemeral password;
the controller comparing the ephemeral password received from the secure request with the ephemeral password received during the most recent boot of the computer platform; and
the controller allowing the ACM to perform the update to the controller management firmware in response to the two ephemeral passwords being equal.

9. An apparatus, comprising:
a central processing unit;
logic to switch a platform firmware update mechanism located in a computer platform to a platform firmware armoring technology (PFAT) mode on a boot of the computer platform, wherein the central processing unit includes a platform firmware storage location storing a first platform firmware;
in response to the platform firmware update mechanism switching to the PFAT mode, logic to persistently lock the platform firmware storage location, wherein, when persistently locked, writes are not allowed to the platform firmware storage location by any entity other than an Authenticated Code Module (ACM) after a platform firmware update mechanism unlocking procedure.

10. The apparatus of claim 9, further comprising logic to:
initiate a special memory write cycle to a PFAT protection control register, wherein the special memory write cycle to the PFAT protection control register causes a controller coupled to the platform firmware storage location to accept write commands from the platform firmware update mechanism to an address space of the platform firmware storage location.

11. The apparatus of claim 10, further comprising logic to:
provide a public encryption key to the platform firmware storage location;
receive an unsecure request to update the first platform firmware with an updated firmware image;
load the updated firmware image into a system memory in the computer platform in response to the unsecure request;
invoke the ACM once the firmware image has completely loaded into system memory;
perform an authentication of the updated firmware image using the public encryption key;
execute the unlocking procedure for the platform firmware storage location in response to the updated firmware image being successfully authenticated; and
copy the authenticated firmware image from the system memory to the platform firmware storage location.

12. The apparatus of claim 11, further comprising logic to:
issue an error when the authentication of the firmware image fails.

13. The apparatus of claim 11, wherein the first platform firmware comprises a system management firmware and wherein the controller comprises a platform component hub.

14. The apparatus of claim 11, wherein the first platform firmware comprises a controller management firmware and wherein the controller comprises an controller located in the computer platform.

15. The apparatus of claim 14, further comprising:
at each boot of the computer platform, logic to
generate an ephemeral password;
store the ephemeral password in a secure location accessible only by the ACM; and
distribute the ephemeral password to at least the controller coupled to the platform firmware storage location.

16. The apparatus of claim 15, further comprising:
in response to the successful authentication of the updated firmware image using the public encryption key, logic to send a secure request to the controller requesting permission to update the controller management firmware, wherein the secure request includes the ephemeral password;
logic within the controller to compare the ephemeral password received from the secure request with the ephemeral password received during the most recent boot of the computer platform; and
logic within the controller to allow the ACM to perform the update to the controller management firmware in response to the two ephemeral passwords being equal.

17. A non-transitory machine-readable medium having stored thereon instructions, which if executed by a machine causes the machine to perform a method comprising:
switching a platform firmware update mechanism located in a computer platform to a platform firmware armoring technology (PFAT) mode on a boot of the computer platform, wherein the computer platform includes a platform firmware storage location storing a first platform firmware;
in response to the platform firmware update mechanism switching to the PFAT mode, persistently locking the platform firmware storage location, wherein, when persistently locked, writes are not allowed to the platform firmware storage location by any entity other than an Authenticated Code Module (ACM) after a platform firmware update mechanism unlocking procedure.

18. The machine-readable medium of claim 17, wherein the unlocking procedure further comprises:
the platform firmware update mechanism initiating a special memory write cycle to a PFAT protection control register, wherein the special memory write cycle to the PFAT protection control register causes a controller coupled to the platform firmware storage location to accept write commands from the platform firmware update mechanism to an address space of the platform firmware storage location.

19. The machine-readable medium of claim 18, wherein the performed method further comprises:
providing a public encryption key to the platform firmware storage location;
receiving an unsecure request to update the first platform firmware with an updated firmware image;
loading the updated firmware image into a system memory in the computer platform in response to the unsecure request;
invoking the ACM once the firmware image has completely loaded into system memory;
performing an authentication of the updated firmware image using the public encryption key;
executing the unlocking procedure for the platform firmware storage location in response to the updated firmware image being successfully authenticated; and
copying the authenticated firmware image from the system memory to the platform firmware storage location.

20. The machine-readable medium of claim 19, wherein the performed method further comprises:
issuing an error when the authentication of the firmware image fails.

21. The machine-readable medium of claim 19, wherein the first platform firmware comprises a system management firmware and wherein the controller comprises a platform component hub.

22. The machine-readable medium of claim 19, wherein the first platform firmware comprises a controller management firmware and wherein the controller comprises an controller located in the computer platform.

23. The machine-readable medium of claim 22, wherein the performed method further comprises:
at each boot of the computer platform,
generating an ephemeral password;
storing the ephemeral password in a secure location accessible only by the ACM; and
distributing the ephemeral password to at least the controller coupled to the platform firmware storage location.

24. The machine-readable medium of claim 23, wherein the performed method further comprises:
in response to the successful authentication of the updated firmware image using the public encryption key, the ACM sending a secure request to the controller requesting permission to update the controller management firmware, wherein the secure request includes the ephemeral password;
the controller comparing the ephemeral password received from the secure request with the ephemeral password received during the most recent boot of the computer platform; and the controller allowing the ACM to perform the update to the controller management firmware in response to the two ephemeral passwords being equal.

25. A system, comprising:

a platform component hub;

a platform firmware storage to store a platform firmware;

a system memory to store an Authenticated Code Module (ACM);

logic to switch a platform firmware update mechanism located in a computer platform to a platform firmware armoring technology (PFAT) mode on a boot of the computer platform; and in response to the platform firmware update mechanism switching to the PFAT mode, the platform component hub to persistently lock the platform firmware storage location, wherein, when persistently locked, writes are not allowed to the platform firmware storage location by any entity other than the ACM after a platform firmware update mechanism unlocking procedure.

* * * * *